Patented June 16, 1936

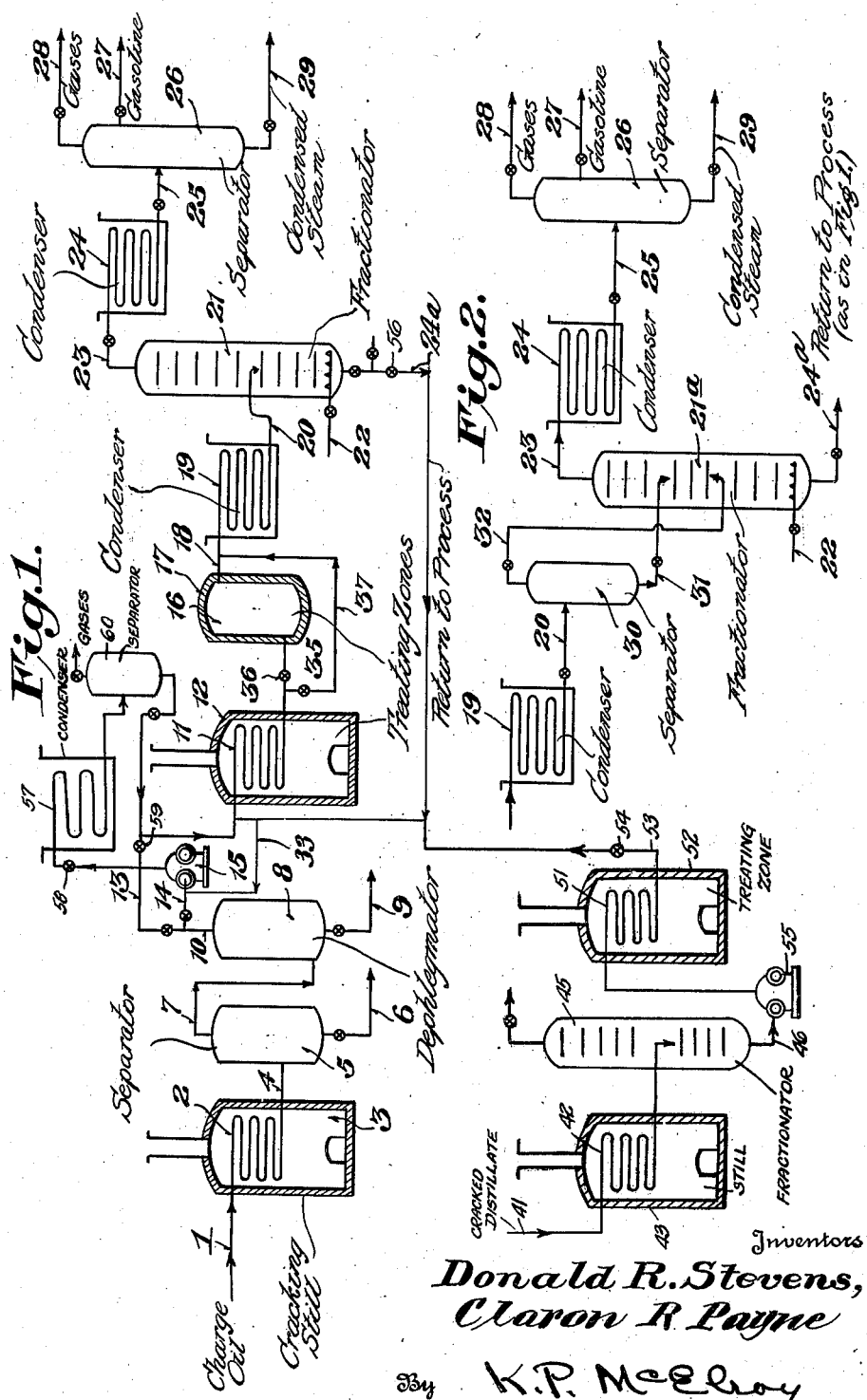

2,044,739

UNITED STATES PATENT OFFICE 2,044,739

DEGUMMING AND STABILIZING HYDROCARBON DISTILLATES

Donald R. Stevens and Claron R. Payne, Pittsburgh, Pa., assignors, by mesne assignments, to Gulf Oil Corporation, Pittsburgh, Pa., a corporation of Pennsylvania Application May 7, 1930, Serial No. 450,591

8 Claims. (Cl. 196—93)

This invention relates to degumming and stabilizing hydrocarbon distillates such as gasoline; and it comprises an improvement in processes of degumming such distillate by temporary exposure to high temperature and pressure wherein the distillate to be treated receives an addition of residues (usually residual oils) usually obtained in the redistillation or fractionation of distillates (usually cracked distillates) treated in the same way in another and prior operation; all as more fully hereinafter set forth and as claimed.

Gasoline derived from the ordinary cracking still distillate, whether such distillate is made in the vapor phase or the liquid phase, on evaporation (whether in the carburetor or elsewhere) leaves a certain amount of residue which is called "gum". The gasoline fractions from such distillate rarely contain a substantial amount of gum but gum develops on standing and particularly where oxidation may occur. Redistillation of such gasoline does not free it of gum and such redistilled gasoline will continue to develop gum on standing. Certain processes have been proposed wherein this gum and gum-yielding tendency can be obviated; but these processes in substance consist in reheating the distillate from which gasoline is to be fractionated or gasoline itself for a brief period to a rather high temperature and under a substantial pressure. In these methods of operation, there is a certain amount of loss corresponding to the amount of gum produced together with independent polymerization loss. The gum is produced from bodies which are of the general nature of gasoline, being perhaps di-olefins, cyclic olefins, etc., of boiling points within the gasoline range. If it were not for their gum-forming tendencies, they would be useful for gasoline. On redistilling a distillate made by a cracking process to fractionate gasoline therefrom or, in fact, on redistilling gasoline fractions, which have been treated at a high temperature and pressure in accordance with the processes described, there is a certain amount of high-boiling residue left, a large proportion when the distillates from a cracking still are fractionated and a relatively smaller proportion when the gasoline itself is distilled. The residue from the distillation of this heat and pressure treated gasoline is usually a small amount of polymerized products.

We have found that, in a process of degumming and stabilizing gasoline or higher-boiling distillates, the amount of gasoline subsequently recovered from a heat and pressure treatment is increased somewhat if there is added to the higher-boiling distillate or the gasoline to be degummed and stabilized a small amount of the residue or residual oil left after fractionating a higher-boiling distillate or redistilling gasoline which materials have at least once been subjected to the aforesaid degumming treatments. With this addition of the said residue or residual oil, not only is the amount of gasoline recovered increased materially, that is there is not as much subtraction of gasoline as incident to aforesaid known degumming methods, but the time of heating is very much abbreviated and the reduction in gum is greater and the gasoline is stabilized so that the tendency to form gum is materially reduced. We have used from 2 to 50 per cent of residue or residual oil with satisfactory results. As to the reason for these results we advance no theory, contenting ourselves with noting the facts. We have noted, however, that the above-mentioned residues from the reheating process, when by themselves heated to the temperatures and pressures of the described treatment, crack to good yields of gasoline of low gum content, and this may have some bearing on the ultimate theory of the reaction.

In a specific embodiment of our invention, as applied to the treatment of a distillate produced by a pyrolytic cracking process, the distillate is treated under a pressure of about 1000 pounds and at a temperature of between 700° and 800° F. to degum it in accordance with the known ways previously mentioned. This distillate may have been subjected to the high temperature-pressure degumming treatment promptly after generation and prior to condensation, or it may have been taken as a condensate and subjected to that treatment. Ordinarily it is one which has been treated for a period of about 30 minutes. This treatment forms no part of the present invention. Such treated distillate is then, in accordance with our invention, distilled or fractionated to produce the desired motor fuel, say a gasoline having an end boiling point of about 400° F. The residual oil from the fractionation of such treated distillate is then added in the proportion of about 20 per cent to cracked distillate which is to be degummed and stabilized. Now in the degumming and stabilizing of this cracked distillate to which the said residual oil is added, the known stabilizing and degumming processes may be used. It is subjected to a temperature of 700° to 800° F.—preferably about 750° F. at a pressure around 1000 pounds, with the result that the new distillate so treated is materially benefited. There is less loss of gasoline to heavy polymerized products and the gum number of the gasoline finally fractionated therefrom is reduced to an extent greater than if the said residual oil from a prior degumming treatment of distillate had not been added. The time of such treatment may be materially less than the 30 minutes which is usual for the treatment of a distillate not containing some of the said residual oil. Gasoline fractionated from a distillate treated in accordance with our process using residual oil from a previous degumming treatment also will stand a longer period of time before development of new gum.

Still further in accordance with our invention, gasoline which has been subjected to the known degumming treatment may be distilled, leaving a small amount of polymerized products. These polymerized products themselves may be used as a residual substance to be added either to a pressure still distillate to be treated in accordance with our process or to a gasoline which it is desired to degum and stabilize. Under these conditions it is desirable to use the same temperatures and pressure as afore-mentioned and to heat under such pressure for a period of 15 minutes or less. It is only necessary to maintain the material under heat and pressure for a time sufficient to produce a stabilized final gasoline product. As in the other instance, the resulting gasoline is freer of gum than that which is simply heated under a pressure in accordance with the processes upon which this invention is an improvement.

In one specific operation, applicants treated a sample of raw vapor phase distillate at a temperature of 770° F. for 10 minutes under high pressure and obtained an oxygen gum number of 300. Four parts of the same raw vapor phase distillate were mixed with one part of residuum from the first treatment and the mixture was subjected to the same conditions for the same length of time. The result was a gum number of 80. The third run with four parts of the same raw vapor phase distillate with one part of the residue from the last mentioned treatment produced a gasoline with a gum number of only 20.

Our invention may be described by reference to the accompanying drawing which shows, more or less diagrammatically, an organization of apparatus elements useful for carrying out our process. In this showing Fig. 1 is a diagrammatic elevational view, partly in section, of the complete apparatus required for the conduct of our process, while Fig. 2 is a similar view of the apparatus required in a modification of the later steps of our process.

In the figures like apparatus elements are designated by like reference numerals.

Referring to Fig. 1, pressure still charging stock, from a source not shown, is forced through line 1 into and through a cracking coil 2 situated in furnace 3. The cracked effluent of the cracking still passes through line 4 into separator 5, where the vaporized portion is separated from the unvaporized portion. Unvaporized residue is withdrawn through valved line 6, the vapors being passed through line 7 into dephlegmator 8. In the latter undesirably high boiling constituents are separated from the desired low boiling constituents. Any high boiling constituents liquefied in the dephlegmator are drawn from its base through valved line 9. The desired distillates of lower boiling point leave, in the form of vapor, through line 10. It is these distillates or condensates derived therefrom upon which our process is designed to operate. The steps incident to their production do not form part of our invention.

Our invention comprises subjecting distillates from a cracking still to high temperature, under high pressure, for a short period of time, and then reseparating from the reaction products components of desired boiling point. In the conduct of our process we heat the vapors from line 10 in a coil 11 situated in a furnace 12, or we may heat them by any equivalent method. If the pressure in dephlegmator 8 is sufficiently high, the vapors in line 10 may be sent through line 13 without passing through pump 15, but if the pressure in dephlegmator 8 is below that desired in the conduct of our process we route the vapors from line 10 through line 14 and compressor 15. The distillate vapors may then pass directly to the treating coil 11, valve 58 being closed and valve 59 being open, or they may first be condensed in coil 57 and freed from gases in separator 60 prior to passage through the treating zones 11 and 16. In this case valve 59 is closed and valve 58 is open.

In our process the vapors are maintained under conditions of high temperature and pressure for a certain predetermined period of time. We usually so choose the dimensions of coil 11 that the time required for passage of the vapors is sufficient to produce the desired results. When the dimensions of coil 11 are insufficient to supply the necessary time interval for the heat treatment we close valve 35 and open valve 36 and thereby route the gases through a heavily insulated capacity chamber 16.

During the heating step there is formed a small amount of material of higher boiling point than the untreated material, and our process includes the separation of this material from the low boiling constituents. For separation of these two fractions we convey the treated vapors through line 18 to a cooler or partial condenser 19 and pass the condensate therefrom through line 20 into fractionator 21. Fractionator 21 is provided with a steam coil 22 or other source of heat in its base to effect the requisite vaporization. The desired low boiling point products are removed as vapor through line 23, and the heavier constituents are removed from the base as a liquid through line 24a. These heavier constituents are returned to the process by line 24a, being introduced prior to coil 11 and either before or after compressor 15. Branch line 33 can be used to conduct this material to the suction side of the compressor. The vapors from fractionator 21 are conveyed through line 23 to a condenser 24 and the condensed product passes through line 25 into separator 26. Stabilized gasoline is withdrawn from separator 26 through line 27, while any uncondensed gas is withdrawn through line 28. Condensed steam is withdrawn through line 29.

Fig. 2 illustrates an alternative mode of performing the steps which follow the treatment of the vapors in coil 11 and chamber 16. This arrangement conserves the heat of the vapors from coil 11 and reduces both the requirement for steam in the dephlegmator and the water requirement in cooler 19. These advantages are attained by a controlled cooling of the heat treated vapors in cooler 19. In this instance the vapors are cooled in 19 only to the extent necessary to reduce their total heat content to that necessary for their fractionation in fractionator 21a. The so cooled stream is delivered through line 20 to a separator 30, where the liquid constituents are separated from the vapor constituents. These two streams are then discharged through lines 31 and 32, respectively, into fractionator 21a, the liquid constituents being introduced into the fractionator at a higher point than are the vapor constituents. The remainder of this process is similar to that described previously in connection with Fig. 1.

While we have more specifically described the addition of residues arising from the operation of the process itself to the gasoline or the distillate to be treated, much the same results may be obtained by adding residues from an ordinary distillation of untreated cracked distillates. Any high-boiling residue obtained from redistillation of cracked gasoline distillates may be used. But the best results are obtained by re-using residues of the known degumming and stabilizing method or the residues resulting from our herein described degumming and stabilizing process. The temperatures and pressures described are exemplificatory only, but those mentioned have been found to be particularly advantageous. However, our invention is not limited in its application to the use of residues and residual oils from previously degummed and stabilized distillates and gasolines treated at 700° to 800° F. and about 1000 pounds pressure, as residual oils from degumming and stabilizing processes at other temperatures and pressures may be used as well as residual oils from the distillation of ordinary cracked distillates. In addition, residues may be used which have been recovered by the distillation of ordinary cracked distillates, these residues having been subjected themselves to a heat and pressure treatment, thus rendering them more active in assisting the degumming and stabilizing process.

When our process is conducted in this fashion an ordinary cracked distillate is distilled to recover a residue, the residue is subjected to the heat and pressure treatment described previously, a small amount of the so-treated residue is mixed with a cracked low boiling distillate and this mixture is subjected to the simple heat and pressure treatment of our invention.

The above procedure is illustrated in Fig. 1. A cracked distillate is passed into still 43 by line 41. It passes through heating coil 42 and into the fractionator 45. A residue is recovered at the lower end of the fractionator, this residue being passed through pump 55 and then through the heat and pressure treating zone 51. After this treatment, which serves to activate the same, it passes through line 53 and joins the distillate coming through lines 13 or 14 prior to passage of the mixture through treating coil 11. During this procedure valve 56 in line 24a may be closed.

What we claim is:

1. In the production of degummed and stabilized gasoline, the process which comprises adding to such gasoline a small proportion of residual oil remaining after the distillation of a distillate which has been subjected to high heat and pressure to degum it, heating such mixture of gasoline and residual oil to a temperature between 700° and 800° F. under a pressure of the order of 1000 pounds for a period sufficient to degum it but less than 30 minutes.

2. In the process of degumming and stabilizing gasoline wherein a cracked distillate is subjected to a simple heat and pressure treatment by heating to a temperature between 700° and 800° F. under a pressure of about 1000 pounds for a period of time sufficient to produce degumming but less than 30 minutes, the improvement which comprises adding to said cracked distillate prior to said heat and pressure treatment a quantity of a residual oil selected from a group consisting of the residues from the distillation of a cracked distillate which has been previously subjected to said heat and pressure treatment, the residues from the distillation of a cracked gasoline which has been subjected to said heat and pressure treatment, the residues from the distillation of an untreated cracked distillate, the residues from the distillation of an untreated cracked gasoline, and the residues from the distillation of a cracked distillate which residues have themselves been subjected to said heat and pressure treatment.

3. In a process of degumming and stabilizing gasoline distillates resulting from the pyrolytic cracking of high-boiling hydrocarbons the steps which comprise adding to such a distillate a proportion of from 2 to 50 per cent of residual oil from a prior distillation of a distillate which has been subjected to a heat and pressure treatment to degum it, and directly thereafter heating such mixture for a period sufficient to produce a stabilized gasoline to a temperature between 700° and 800° F. a pressure of the order of about 1000 pounds per square inch.

4. In the process of degumming and stabilizing cracked low boiling distillates by a heat treatment at a high temperature and under pressures of the order of 1000 pounds per square inch followed by recovery of substantially the entire amount of cracked low boiling distillate as a a degummed and stabilized product of substantially the same boiling point, the step of adding to such a cracked distillate immediately prior to said heat and pressure treatment from 2 to 50 per cent of residual oil resulting from the fractionation of a distillate which has been previously subjected to said heat and pressure treatment to degum it.

5. In the production of degummed and stabilized gasoline, the process which comprises adding to a gasoline a small proportion of residual oil remaining after the distillation of a distillate which has been subjected to high heat and pressure to degum it, heating such mixture of gasoline and residual oil to a temperature between 700° and 800° F. under a pressure of about 1000 pounds for a period of the order of 15 to 30 minutes and recovering from the reaction products a degummed and stabilized gasoline.

6. In a process of degumming and stabilizing low boiling distillates resulting from the pyrolytic cracking of high boiling hydrocarbons, the process which comprises distilling an ordinary cracked distillate to recover a residue, subjecting said residue to a heat and pressure treatment at a pressure of the order of 1000 pounds per square inch and at a temperature of from about 700° to 800° F. for a period of about 15 to 30 minutes to render said residue more active in degumming and stabilizing, adding a small amount of the so-treated residue to a cracked low boiling distillate and subjecting the mixture to a simple heat and pressure treatment for a period of time sufficient to produce degumming at high temperatures somewhat below cracking temperatures and under high pressures, followed by recovery of substantially the entire amount of cracked low boiling distillate as a degummed and stabilized product of substantially the same boiling point.

7. In a process for effecting the removal of gum-forming bodies from cracked low boiling unsaturated hydrocarbon oils, the step which consists in passing a solely petroleum liquid mixture of such oils and hydrocarbon polymers containing the aforesaid bodies through a heating zone wherein the mixture is heated to a temperature considerably above its normal vaporizing temperature but below a cracking temperature while maintained under pressures of at least 1000 pounds per square inch.

8. The process of degumming and stabilizing cracked gasoline distillates which comprises flowing a stream of a solely petroleum mixture of such distillate and polymer-containing oil formed as hereinafter set forth through a zone wherein it is subjected to a temperature substantially in excess of the normal vaporizing temperature of said distillate but below a cracking temperature while maintained under a high pressure of around 1000 pounds per square inch, subjecting the treated distillate to fractionation to separate vapors of gasoline having a predetermined end boiling point from polymer-containing higher boiling oil, condensing the treated gasoline vapors, and recycling at least a portion of said polymer-containing oil for admixture with the stream of distillate entering the zone of heat and pressure.

DONALD R. STEVENS.
CLARON R. PAYNE.